(12) United States Patent
Tavares et al.

(10) Patent No.: US 9,573,222 B2
(45) Date of Patent: Feb. 21, 2017

(54) METHOD AND DEVICE FOR FRICTION STIR WELDING

(75) Inventors: Sergio Tavares, Carregosa (PT); Marco Pacchione, Hamburg (DE); Hartmut Ostersehlte, Bremen (DE)

(73) Assignee: Airbus Operations GmbH, Hamburg (DE)

( * ) Notice: Subject to any disclaimer, the term of this patent is extended or adjusted under 35 U.S.C. 154(b) by 133 days.

(21) Appl. No.: 13/810,558

(22) PCT Filed: Jul. 15, 2011

(86) PCT No.: PCT/EP2011/062130
§ 371 (c)(1),
(2), (4) Date: Mar. 29, 2013

(87) PCT Pub. No.: WO2012/007573
PCT Pub. Date: Jan. 19, 2012

(65) Prior Publication Data
US 2013/0206817 A1    Aug. 15, 2013

Related U.S. Application Data (60) Provisional application No. 61/364,837, filed on Jul. 16, 2010.

(30) Foreign Application Priority Data

Jul. 16, 2010   (DE) ........................ 10 2010 027 291

(51) Int. Cl.
*B23K 20/12*    (2006.01)
(52) U.S. Cl.
CPC ........ *B23K 20/1255* (2013.01); *B23K 20/126* (2013.01)

(58) Field of Classification Search
CPC ............................. B23K 20/126; B23K 20/122
(Continued)

(56) References Cited

U.S. PATENT DOCUMENTS 5,460,317 A    10/1995  Thomas et al.
5,769,306 A *   6/1998  Colligan .............. B23K 20/126
                                                        228/112.1
(Continued)

FOREIGN PATENT DOCUMENTS

CN    1568241    1/2005
CN    1590003    3/2005
(Continued)

OTHER PUBLICATIONS

Chinese Patent Office, Chinese Office Action, dated Oct. 22, 2014, for related CN application No. 201180044520.7.
German Patent Office, German Office Action, dated Dec. 5, 2012.

*Primary Examiner* — Devang R Patel
*Assistant Examiner* — Carlos Gamino
(74) *Attorney, Agent, or Firm* — Greer, Burns & Crain, Ltd.

(57) ABSTRACT

A method for friction stir welding two components, with a rotating tool that comprises a rotating or non-rotating shoulder surface for subjecting the components to a process force in the region of a joining zone, and with a stirring pin for stirring plasticized material or for plasticizing and stirring the components in the region of the joining zone, in which method a stirring pin with a section slidably plunges in a slide on which the components are supported, which slide is guided along the joining zone on a side of the component, which side faces away from the tool, so that during welding an automatic relative movement between the stirring pin and the slide or the shoulder surface of the tool and a support surface of the slide, which support surface supports the (Continued)

components, is made possible, as well as a device for implementing such a method.

10 Claims, 11 Drawing Sheets

(58) Field of Classification Search
USPC .......................................................... 228/50
See application file for complete search history.

(56) References Cited

U.S. PATENT DOCUMENTS

| | | | |
|---|---|---|---|
| 6,199,745 B1 | 3/2001 | Campbell et al. | |
| 6,237,835 B1 | 5/2001 | Litwinski et al. | |
| 6,484,924 B1 * | 11/2002 | Forrest | 228/112.1 |
| 7,455,212 B2 * | 11/2008 | Mika | 228/112.1 |
| 7,686,202 B1 * | 3/2010 | Carter et al. | 228/2.1 |
| 2003/0201307 A1 | 10/2003 | Waldron et al. | |
| 2006/0231594 A1 | 10/2006 | Murakawa et al. | |
| 2008/0029578 A1 * | 2/2008 | Steel et al. | 228/2.1 |
| 2009/0152328 A1 * | 6/2009 | Okamoto et al. | 228/112.1 |
| 2010/0006622 A1 * | 1/2010 | Smith | B23K 20/125 228/2.1 |
| 2011/0248070 A1 * | 10/2011 | Furfari et al. | 228/112.1 |
| 2012/0193401 A1 * | 8/2012 | Hori et al. | 228/112.1 |
| 2013/0334289 A1 * | 12/2013 | Pacchione et al. | 228/2.1 |

FOREIGN PATENT DOCUMENTS

| | | |
|---|---|---|
| WO | WO9310935 | 6/1993 |
| WO | 0002699 | 1/2000 |
| WO | WO0002704 | 1/2000 |
| WO | WO 2013026513 A1 * | 2/2013 |

* cited by examiner

METHOD AND DEVICE FOR FRICTION STIR WELDING

RELATED APPLICATIONS

This application claims benefit of U.S. provisional application No. 61/364,837, filed Jul. 16, 2010 and German patent application No. 10 2010 027 291.4, filed Jul. 16, 2010, the entire disclosures of which are herein incorporated by reference.

BACKGROUND OF THE INVENTION

The invention relates to a method for friction stir welding to connect two components with a tool comprising a shoulder surface for subjecting the components to a process force in the region of a joining zone and a rotating stirring pin for stirring plasticized material or for plasticizing and stirring the components in the region of the joining zone, and to a device for connecting two components by friction stir welding with a tool that comprises a shoulder surface for subjecting the components to a process force in the region of a joining zone and a rotatable stirring pin for stirring plasticized material or for plasticizing and stirring the components in the region of the joining zone.

Friction stir welding makes it possible to integrally join two components that with the use of conventional melt welding methods cannot be welded, or that can only be welded with great difficulty. Friction stir welding is predominantly used for welding light metals. There is no need to add welding filler. In a known friction stir welding method, as described, for example, in WO 93/10935 A1, a stirring pin or welding pin, which extends from a shoulder surface of a rotating cylinder, is pressed into a butt joint of two components and is guided along said butt joint, wherein the shoulder surface of the cylinder subjects the components to a one-sided process force. As a result of the friction between the shoulder surface and the components heat arises, by means of which the material in the butt joint is plasticized, and the material is then stirred as a result of the immersion of the stirring pin. In the region of the butt joint or of the joining zone the components are supported on a counter-holder, which due to the process forces and contact with the stirring pin is subjected to very considerable wear and thus needs to be sporadically replaced correspondingly. In particular in the case of spherically-shaped large area components or spherically-extending joining zones, for example in the case of shell elements of an aircraft fuselage, wear of the counter-holders is considerably increased because apart from the process forces further factors such as differing thermal expansion coefficients and component tolerances have an additional negative influence on the state of the support. However, in particular the distance between the stirring pin head or the stirring pin tip and the counter-holder is a very critical process variable that must be closely observed in order to allow adequate stirring of the plasticized material. Even minimally insufficient immersion depth of the stirring pin, i.e. excessive spacing of the stirring pin tip from the support, results in a noticeable reduction in the quality of the weld seam. In addition to this, variations in the thickness of the components and different gap widths in the region of the joining zone result in a change in the immersion depth of the stirring pin. Furthermore, the stirring pin has a tendency, as a result of the process forces occurring, to drift in the transverse direction of the joining zone, which also results in a reduction in the quality of the weld seam.

A known solution for taking into account at least the variations in the thickness of the components in the region of the joining zone thus provides for pressing the shoulder surface in a force-controlled manner at a constant force against the components, and for designing the stirring pin so that it is movable along its vertical axis and is thus position controlled. To this effect, for example, in the direction of welding in front of the stirring pin a stylus device for sensing instances of unevenness in the material or variations in the thickness of the components is provided, which then immediately reports the aforesaid to an actuator for adjusting the immersion depth of the stirring pin. However, such a control device or regulating device is costly and complex, both from the point of view of device technology and control technology.

A known device-related and method-related solution, which at all times ensures adequate immersion depth or stirring, is also shown in WO 93/10935 A1 and in WO 00/02699 A1. The bobbin tool described therein comprises two opposite shoulder surfaces between which the components are clamped. One shoulder surface is formed by the cylinder, and the other shoulder surface by a plate-shaped head. The welding pin penetrates the cylinder and is rotatably held in said cylinder. In this method the components are subjected in the butt joint region by opposing process forces of equal force so that friction stir welding takes place so as to be quasi-neutral in terms of the vertical force. Apart from an always adequate immersion depth and good tracking of the stirring pin, this method provides other advantages, in particular a homogeneous heat input and little distortion of the components. However, the stirring pin is highly loaded because by way of it both the forces for rotating the plate and the forces for transversally moving the plate are inserted. Further disadvantages include a seam collapse on the sides of the plate surface (second shoulder surface) and comparatively expensive control technology or regulating technology. Moreover, welding thin-walled components is problematic because of the high heat input.

Very recent developments thus provide for weld tools with a stationary, non-rotating, shoulder and a rotating stirring pin. In this manner no heat is introduced into the component through the shoulder but only through the stirring pin.

In the case of curved component regions, U.S. Pat. No. 6,237,835 B1 provides for a slide that is movable in longitudinal direction of the seam, which slide is guided on the back of the components and is in active engagement with the stirring pin, for example having positive fit, so that the slide is quasi pulled towards the rear, and the component regions are clamped between the shoulder surface and the slide. However, with this solution it is not possible to react to varying material thicknesses during the welding process.

SUMMARY OF THE INVENTION

It is the object of the present invention to create a method for connecting two components by friction stir welding, which method overcomes the above-mentioned disadvantages and makes it possible to create a weld seam of high quality, and to create a device for implementing such a method.

This object is met by a method, and by a device.

In a method according to the invention for connecting two components by friction stir welding with a tool comprising a shoulder surface for subjecting the components to a process force in the region of a joining zone and a rotating stirring pin for stirring plasticized material or for plasticizing and stirring the components in the region of the joining zone, a section of the stirring pin slidably plunges in a slide on which the components are supported, which slide is guided along the joining zone on a side of the components, which side faces away from the tool. As a result of this the joining zone in the direction of its vertical axis is always penetrated by the stirring pin, and consequently there is no need for adjustment of an immersion depth, and complete stirring of the plasticized material is made possible. At the same time the slide serves as a counter-holder so that the components are securely supported during welding. Due to the fact that the stirring pin and the slide are slidable or movable relative to each other in the direction of the vertical axis, the device automatically compensates for variations in the thickness of the components. An actuator for moving the stirring pin along its vertical axis for regulating the immersion depth is not necessary. Thus, purely force-controlled controlling of the tool is possible. In other words, the tool can be pressed at a constant force against the components. There is no need to provide a separate device for scanning the surface geometry ahead of the tool in the direction of welding in order to adjust the immersion depth of the stirring pin.

In a preferred exemplary embodiment the slide is guided along by the stirring pin by way of active engagement. In this manner the control device of the device or of the tool can be further simplified because no separate slide drive is required.

In another exemplary embodiment the slide is, however, driven by way of its own drive, at least so as to support the stirring pin. This is advantageous, in particular, when welding thick-walled components so as to relieve the stirring pin.

The position of the tool in the x-y plane can be defined by way of the position of the slide. This is advantageous, in particular, in those cases where the tool is, for example, controlled by way of a robot arm that can only conditionally maintain the position of the tool, so that the position of the slide or of the slides per se is used as a control and correction element.

For mechanically coupling the stirring pin to the slide at the beginning of the welding process, one exemplary embodiment provides for a through-hole to be made in the joining zone, through which through-hole the section of the stirring pin is then inserted in the slide.

A device according to the invention for connecting two components by friction stir welding has a tool that comprises a shoulder surface for subjecting the components to a process force in the region of a joining zone and a rotatable stirring pin for stirring plasticized material or for plasticizing and stirring the components in the region of the joining zone. According to the invention the device comprises a slide for the section-by-section slidable reception of the stirring pin and for supporting the components, which slide is movably guided along the joining zone on a side of the components, which side faces away from the tool. Such a device makes it possible to implement the above-described method according to the invention both in a butt joint arrangement and in an overlap arrangement of the components so that the plasticized material is always adequately stirred, and thus weld seams even of large-area components can be produced reliably and reproducibly at high quality.

In one exemplary embodiment the slide comprises a bore for receiving a head section of the stirring pin. Said bore can quickly be made in the slide and represents a reliable mechanical guide during movement of the slide in the direction of welding or in the longitudinal direction of the joining zone by way of the stirring pin. In one exemplary embodiment the head section of the stirring pin is cylindrical. Consequently, the head section received in the slide does not tend to tilt, and slight displacements of the slide or of the tool in the direction of the longitudinal axis and of the transverse axis of the joining zone or of the channel can be compensated for.

In order to prevent the stirring pin during welding from being offset or from drifting in the transverse direction relative to the direction of welding it is advantageous if a channel for receiving the slide is provided, which channel extends in the longitudinal direction of the joining zone, with the depth of said channel approximately corresponding to the height of the slide so that the slide finishes so as to be flush or almost flush with a supporting surface of a support for placing the components. In deciding on the height of the slide, the type of its bearing arrangement, for example on slide rails or rolling elements, must of course also be taken into account.

The device according to the invention is extremely robust if the slide is guided in the channel on a plain bearing arrangement. In this arrangement at least one supporting surface facing the components, and/or one bottom surface of the slide, which bottom surface faces the channel, can comprise a coating for reducing frictional resistance.

In another exemplary embodiment a roller bearing arrangement is formed between the slide and the channel, and consequently the friction coefficient is further reduced.

In order to also be able to carry out welding tasks, and in particular positioning tasks relating to the components and the slide in a position in which the tool is positioned underneath the components and thus the slide is positioned above the components, the bearing arrangement can be designed in such a manner that movement of the slide, at least in the region in which the components to be welded are positioned, is blocked in the direction of the vertical axis of the channel. Of course, it is imaginable to insert the slide into, or to remove it from, the channel by way of a movement in the direction of the vertical axis, which slide is then, for example, secured in, or released from, the channel by way of a longitudinal movement.

In order to move the slide in the channel, a separate drive can be provided that represents both a sole movement of the slide and a supporting function for the stirring pin pushing the slide.

The supporting surface of the slide can comprise any desired geometric shapes. In particular, the geometric shape is guided by the course of the joining zone. For example, it is preferred if the supporting surface of the slide for welding curved components is designed so as to be correspondingly curved in the direction of welding. In other words, during guiding of the tool along a concave component section at least the supporting surface is designed so as to be correspondingly concave. During guiding of the tool along a convex component section at least the supporting surface is designed so as to be correspondingly convex. In addition, the bottom surface of the slide, which surface is opposite the supporting surface, can be of a correspondingly concave or convex design, which is advantageous to the extent that during welding of curved components or component sections the channel also extends in a curved shape.

In another exemplary embodiment the slide has a wedge-like nose region that prevents the movement of the slide from being blocked by an unforeseen material projection of the components into the channel, which could result in damage to the stirring pin.

Other advantageous embodiments of the present invention form part of further subordinate claims.

BRIEF DESCRIPTION OF THE DRAWINGS

Below, preferred exemplary embodiments of the invention are explained in more detail with reference to diagrammatic illustrations. The following are shown.

DETAILED DESCRIPTION OF THE PREFERRED EMBODIMENTS

Figure 1A:
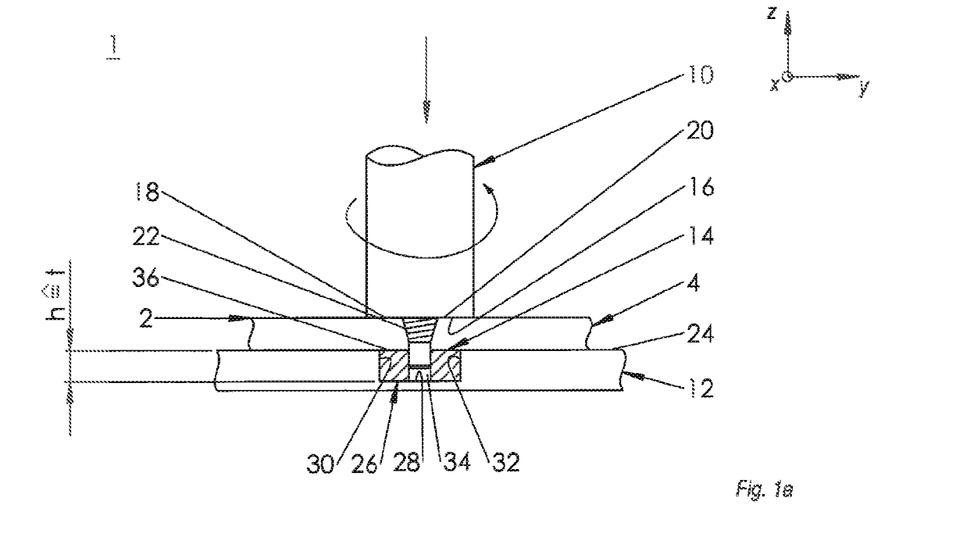
FIGS. 1a and 1b a section of a first exemplary embodiment of a device according to the invention when connecting two components in a butt joint.
Figure 1B:
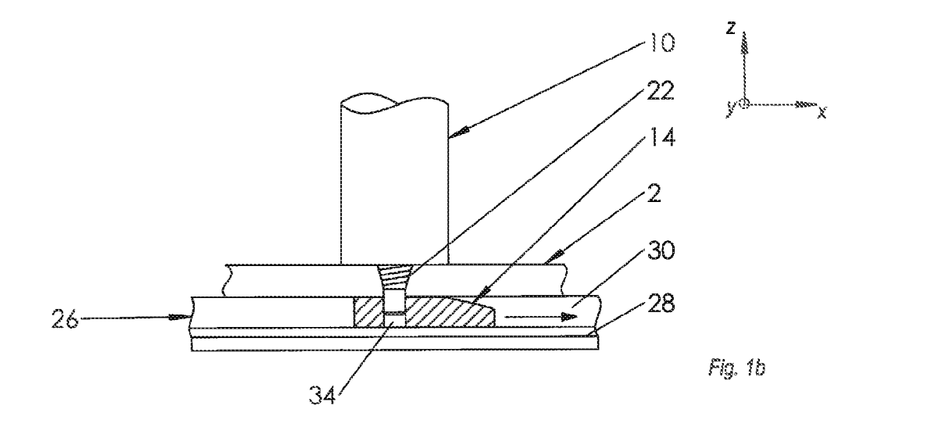

FIG. 1 shows a first exemplary embodiment of a device 1 according to the invention for friction stir welding two components 2, 4 that with opposite edge regions 6, 8 are positioned in a butt joint relative to each other, thus defining a joining zone. The components 2, 4 preferably comprise a light metal alloy, for example from an aluminium alloy, magnesium alloy or titanium alloy, and are, for example, curved shell elements of an aircraft fuselage, which shell elements are to be welded in the longitudinal direction and the circumferential direction to adjacent shell elements. According to the illustration in FIG. 1, the device 1 comprises a tool 10, a support 12 and a slide 14. However, the components 2, 4 can also comprise a steel alloy.

The tool 10 rotates on its longitudinal axis z or the vertical axis of the joining zone and comprises a shoulder surface 16 for plasticizing the components 2, 4 in the region of the joining zone, which in each case rests against an opposite edge area 18, 20 of the components 2, 4. Furthermore, the tool 12 comprises a stirring pin 22 for stirring the plasticized material, which stirring pin 22 extends centrally from the shoulder surface 16 and plunges into the butt joint between the components 2, 4.

The support 12 has a supporting surface 24 for placing the components 2, 4, in which supporting surface 24 a channel 26 has been formed. The channel 26 extends in the direction of welding or longitudinal direction x of the joining zone and comprises, for example, a rectangular cross section with a bottom wall 28 and two opposing sidewalls 30, 32.

The slide 14 is a counter-holder, which can be moved in the channel 26 in longitudinal direction x, on which counter-holder the components 2, 4 are supported in the region of the joining zone. The slide 14 comprises a bore 34, which penetrates it in the z-direction for section-by-section loose or slidable reception of the stirring pin 22 in the z-direction. The maximum height h of the slide 14 including its bearing arrangement essentially corresponds to the maximum depth t of the channel 26 so that a supporting surface 36 of the slide 14 for supporting the components 2, 4 in the joining zone region finishes so as to be flush with the supporting surface 24 of the support 12. In a movement of the tool 10 in the x-direction the slide 14 is taken along by way of the active engagement with the stirring pin 22, but it can also have its own drive for moving in the x-direction.

Figure 15:
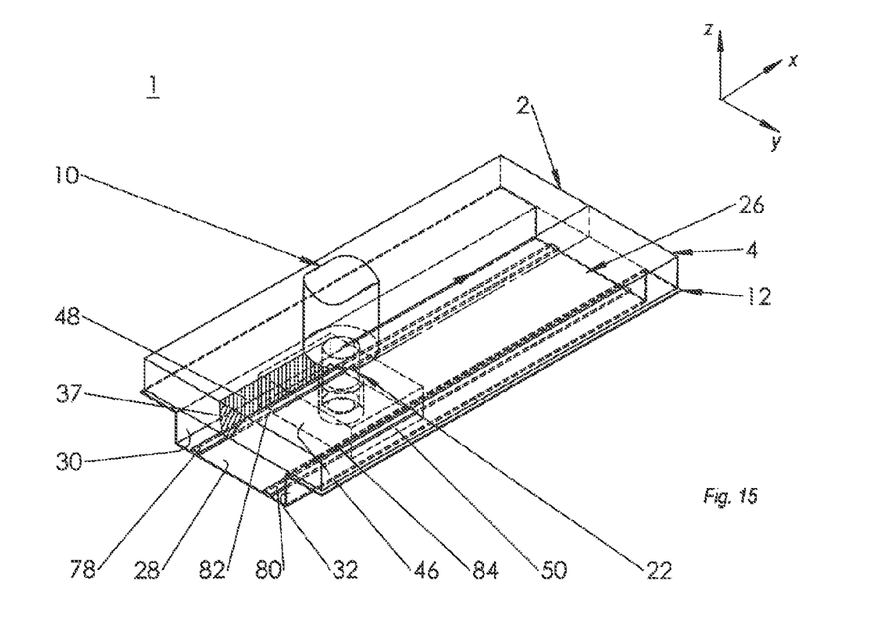
FIG. 15 a ghost image of an alternative plain bearing arrangement of the slide.

For welding the components 2, 4 they are placed onto the support 12 with their edge regions 6, 8 above the channel 26 and are correspondingly clamped. Thereafter, in the starting region of the butt joint a through-hole (not shown) for guiding the stirring pin 22 through it is made. The slide 14 is positioned so as to be flush, with its bore 34 underneath the through-hole, in the region of the joining zone, and the stirring pin 22 by way of placement of the tool 10 onto the components 2, 4 is inserted into the bore 34 of the slide 14. Subsequently, the tool 10 is subjected to a process force pointing in the direction of the components 2, 4, and is made to rotate so that between the rotating shoulder surface 16 and the edge areas 18, 20 heat arises to such an extent that the edge regions 6, 8 of the components 2, 4 in the region of the shoulder surface 16 are plasticized. The plasticized material is stirred by way of the stirring pin 22, and the tool 10 is continuously moved in the x-direction along the butt joint until a weld seam 37, shown in FIG. 15, is formed and the components 2, 4 are thus firmly interconnected. During the transversal exertion of pressure or force of the tool 10, the edge areas 6, 8 are supported by the supporting surface 36 of the slide 14 so that said edge areas 6, 8 are clamped between the shoulder surface 16 of the tool 10 and the supporting surface 36 of the slide 14. The rotating stirring pin 22 constantly plunges, section-by-section, into the slide bore 34, thus penetrating the butt joint or the plasticized material in the z-direction. As a result of the continuous active engagement of the stirring pin 22 in the slide bore 34 the tool 10 guides the slide 14 along during movement in the x-direction. Since the slide 14 is not fixed to the stirring pin 22 and does not maintain a fixed distance from the shoulder surface 16, but instead the tool 10 is held so as to be slidable in the z-direction relative to the slide 14, the penetration depth of the stirring pin 22 in the slide bore 34 van vary; consequently, for example, variations in the thickness of the components 2, 4 are automatically compensated for, without the need for elaborate adjustment of the position of the stirring pin 22 in the z-direction. Accordingly, the device 1 is predominantly operated in a force-oriented manner at a constant process force.

Figure 2:
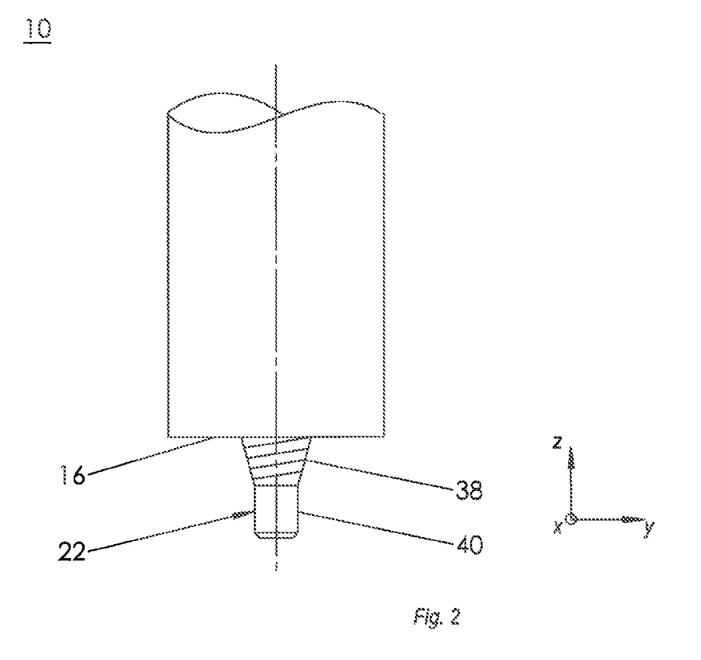
FIG. 2 a tool according to the invention of the device of FIG. 1.

According to FIG. 2 the tool 10 is formed as a cylinder on whose face the shoulder surface 16 is formed. The stirring pin 22, which is firmly connected to the tool 10, extends centrally from the thus ring-like shoulder surface 16 and comprises a conical threaded section 38 at the base, and a cylindrical head section 40.

The threaded section 38 is used for mixing the plasticized material and radially tapers off in the direction of the head section 40. At least the axial length or extension of the threaded section 38 in the z-direction or along the axis of rotation of the tool 10 has been selected depending on the thickness of the materials of the components 2, 4 to be welded. Further settable parameters include, for example, the thread pitch and the cone angle.

The head section 40 is used to establish the mechanical coupling between the tool 10 and the slide 14 in the x-direction. Said head section 40 is guided in the slide bore 34 so as to be slidable in the z-direction. Its diameter has been selected such that said head section 40 is received in the bore 34 quasi by way of a clearance fit. Its extension in the z-direction has been selected, depending on the thickness of the materials of the components 2, 4 to be welded, in such a manner that it always plunges into the bore 34. Its diameter is predominantly guided by the material to be welded and by the thickness of the components 2, 4 to be welded.

Figure 3:
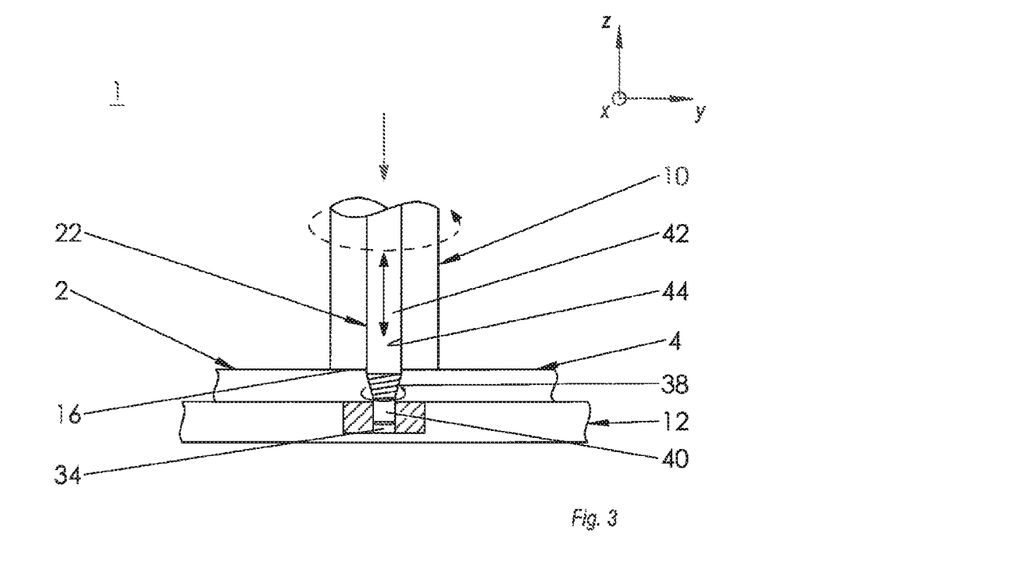
FIG. 3 a section of a second exemplary embodiment of the device according to the invention.

FIG. 3 shows an exemplary embodiment of the device 1 according to the invention, in which in contrast to FIGS. 1 to 2 the stirring pin 22 is guided in the tool 10 so as to be axially slidable, and rotatable separately of the shoulder surface 16, and thus by itself, which is indicated by the dashed arrow regarding the shoulder surface 16 and by the solid-line arrow regarding the stirring pin 22. The stirring pin 22 comprises a guide section 42, which in the z-direction can be extended from and retracted to an axial bore 44 of the tool 10 by way of an actuator (not shown). In this variant the threaded section 38 and the head section 40 can be positioned at different spacing from the shoulder surface 16 so that this device 1, in contrast to the above-described device according to FIGS. 1a and 1b, can be used with the tool 10 according to FIG. 2 with components 2, 4 of almost any thickness. In particular, this device 1 is suitable for welding components 2, 4 with very considerable changes in thickness in the region of the joining zone because the optionally rotating or non-rotating shoulder surface 16, or the optionally rotating or non-rotating cylinder that forms the shoulder surface 16, can be operated in a force-controlled manner, and the stirring pin 22 can be operated in a position-controlled manner. In other words, the shoulder surface 16 is pressed at a constant force against the components 2, 4, and the stirring pin 22 is retracted or extended by way of a stylus device that is arranged in front of the tool 10 in the direction of welding.

If the shoulder surface 16 is of a non-rotating design, the rotating stirring pin 22 is also used for plasticizing the components 2, 4 in the region of the joining zone. If both the shoulder surface 16 and the stirring pin 22 are made to rotate, the cylinder or the shoulder surface 16 and the stirring pin 22 can rotate at the same speed or at different speeds. The question as to whether the shoulder surface 16 is also made to rotate depends, in particular, on process parameters such as the component thickness and the component material.

According to the illustrations in FIGS. 4 to 8 the slide 14 can comprise a multitude of geometric shapes, some of which are shown below as examples. In all the exemplary embodiments the slide bore 34 is arranged in a middle region and is preferably a through-hole. Commercially available tool steel is a preferred slide material.

Figure 4:
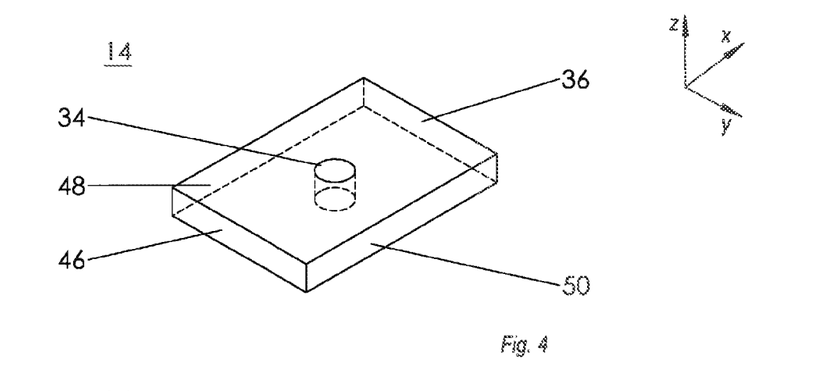
FIGS. 4, 5a, 5b, 6, 7a, 7b, 8 variants of a slide according to the invention of the device.

In the exemplary embodiment shown in FIG. 4 the slide 14 has a rectangular cross section with a planar supporting surface 36, a bottom surface 46 opposite the aforesaid, and two lateral surfaces 45, 50 that extend in the x-direction. The supporting surface 36 and the bottom surface 46 as well as the lateral surfaces 48, 50 all extend so as to be parallel to each other.

Figure 5A:
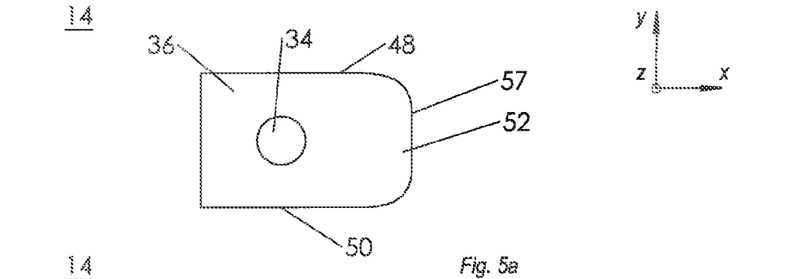
Figure 5B:
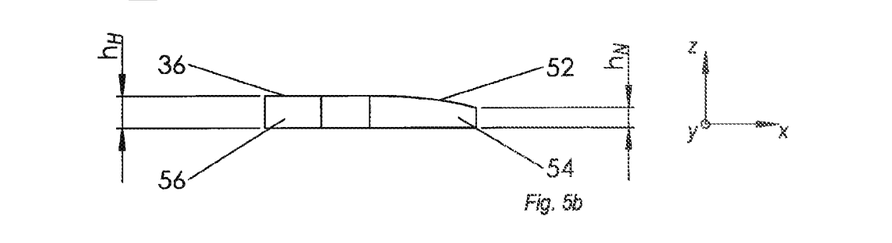

In the exemplary embodiment of a slide 14 shown in FIGS. 5a and 5b the supporting surface 36 makes a transition in the welding direction x to a wedge surface 52, and consequently the slide 14 comprises a nose region 54 with a height HN that is smaller than a height HH of its rear region 56. The nose region 54 comprises an end face 57 whose transition regions to the lateral surfaces 48, 50 are designed so as to be rounded. By means of the wedge shape and by means of the rounded shape of the nose region 54, blocking of the slide 14 by material projections of the component 2, 4, which material projections project in an unforeseen manner into the channel 26, is prevented.

Figure 6:
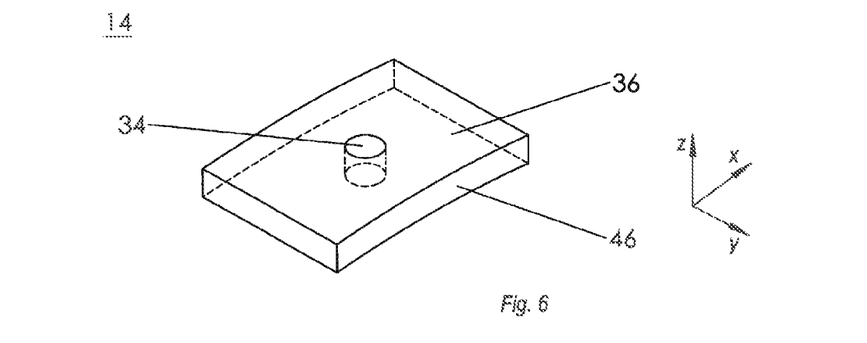

According to the exemplary embodiment shown in FIG. 6, the supporting surface 36 and the bottom surface 46 can be designed to be curved in the direction x of welding, and consequently this exemplary embodiment is particularly suited to the welding of curved components 2, 4.

Figure 7A:
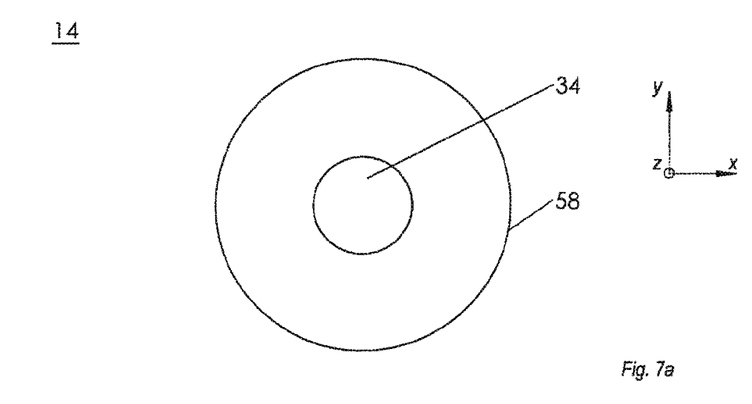
Figure 7B:
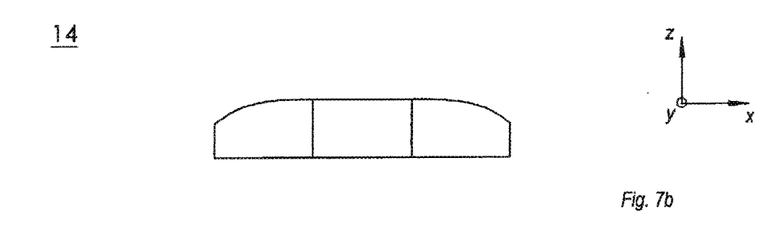
Figure 8:
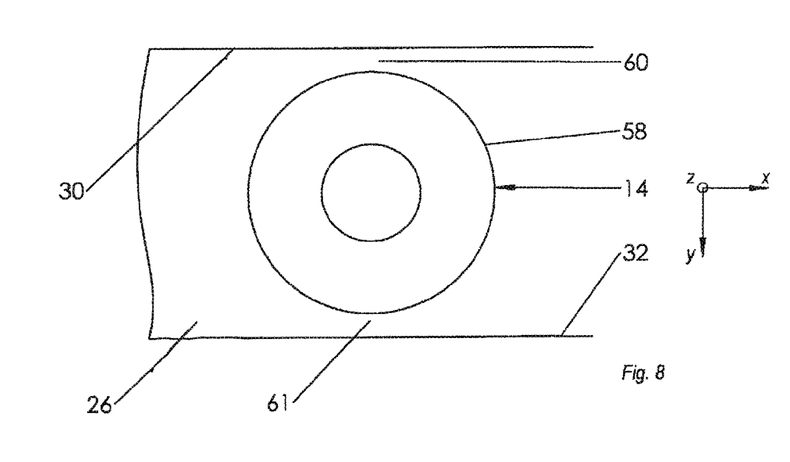

According to the exemplary embodiment according to FIGS. 7a and 7b, the slide 14 can also be designed as an annular body with a circular cross section and a cylindrical outer circumferential wall 58.

Figure 9:
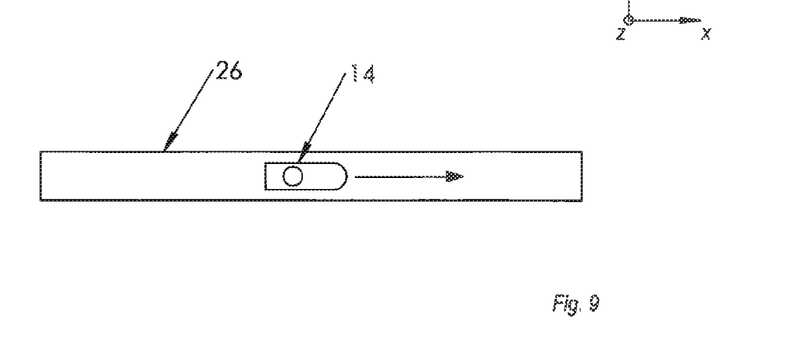
FIGS. 9 and 10 variants of a channel according to the invention of the device.

In order to prevent clamping of the slide 14 during movement in the x-direction within the channel 26, it can be advantageous if, as shown for example on the ring-like slide 14 in FIG. 9, in each case a gap 60, 61 is formed between the outer circumferential wall 58 and the opposite sidewalls 30, 32 of the channel 26.

Figure 10:
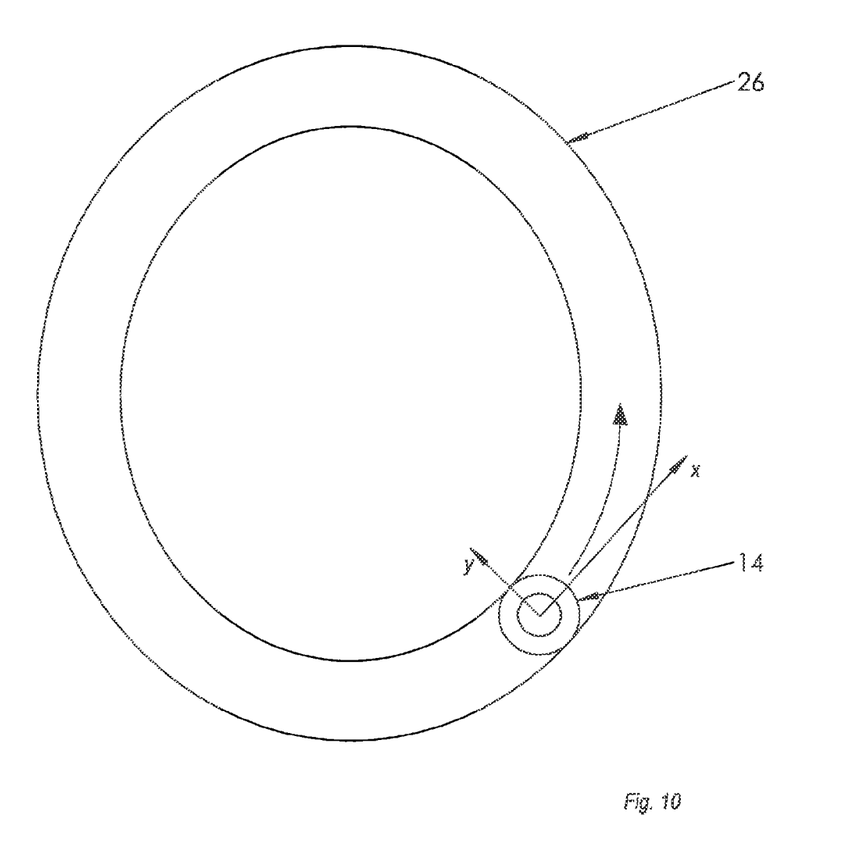

The geometry of the slide 14 or the slide selection is guided, in particular, by the geometry of the components 2, 4 to be welded in the region of the joining zone. For example, as shown in FIG. 9, for guiding a slide 14 along a straight channel 26 in order to form a straight weld seam, a wedge-shaped slide 14, shown in FIGS. 5a and 5b, comprising a rounded nose region 54 is preferred. For guiding a slide 14 along a curved channel 26 to form ring-shaped weld seams, for example for welding aircraft window frames with window cut-outs on the fuselage side, as shown in FIG. 10, a ring-shaped slide 14 shown in FIGS. 7a and 7b is preferred.

Figure 11:
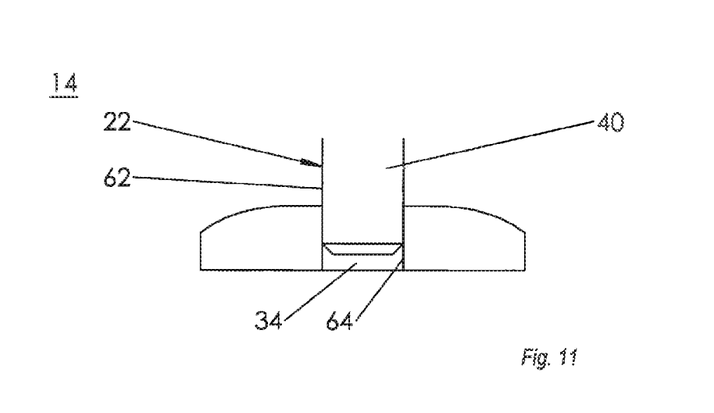
FIGS. 11, 12 and 13 plain bearing arrangements according to the invention of the stirring pin in a slide of the device.
Figure 12:
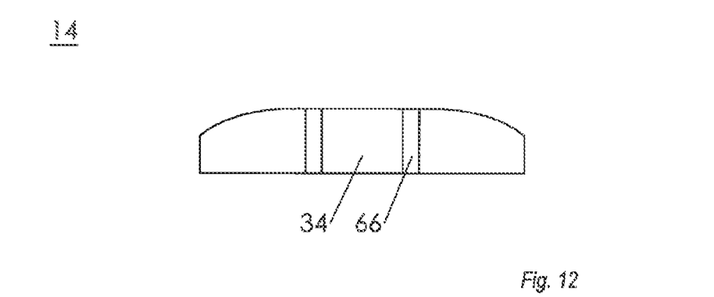
Figure 13:
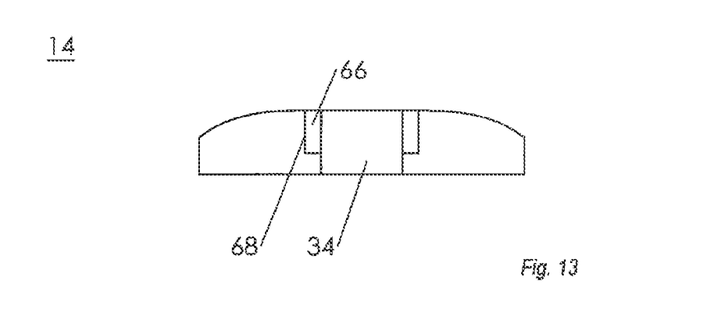

As shown, for example, in FIGS. 11, 12 and 13, the head section 40 of the stirring pin 22 is guided in the bore 34 by way of a plain bearing arrangement.

Thus, FIG. 11 shows an exemplary embodiment in which the head section 40, by a section of its outer wall 62, is in direct sliding contact with an opposing section of the inner wall 64 of the bore 34.

FIG. 12 shows an exemplary embodiment in which a sliding bush 66 has been inserted in the bore 34 in order to reduce frictional resistance. The sliding bush 66 can extend over the entire axial length of the bore 34 or, as shown in FIG. 13, merely over a region 68 of the slide 14, which region 68 is near the supporting surface. The material of the sliding bush 66 is optimally attuned to the material of the head section 40 of the stirring pin 22 and can additionally comprise a coating in order to reduce frictional resistance. Bronze is one example of a material used for the sliding bush. The latter can, however, comprise a plastic or some other metal by means of which the friction coefficient can be reduced.

As shown in FIGS. 14a, 14b, 15 and 16, the slide 14 can be guided in the channel 26 by way of a plain bearing arrangement. In this context in order to reduce the frictional resistance it is preferred in all the exemplary embodiments if the slide 14 at least in the region of its outer surfaces 36, 46, 48, 50 comprises a friction reducing coating.

Figure 14A:
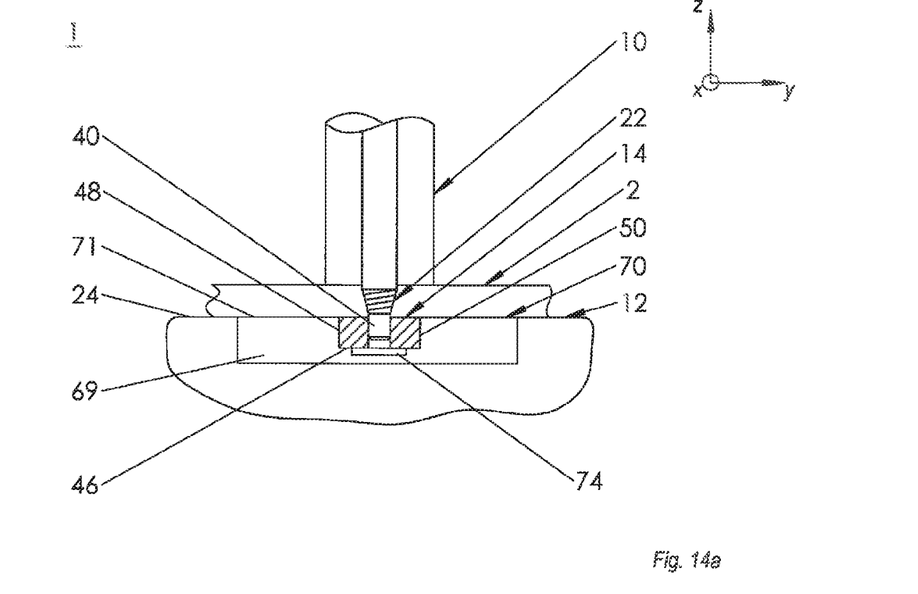
FIGS. 14a and 14b a section of an inventive plain bearing arrangement of the slide in a channel.
Figure 14B:
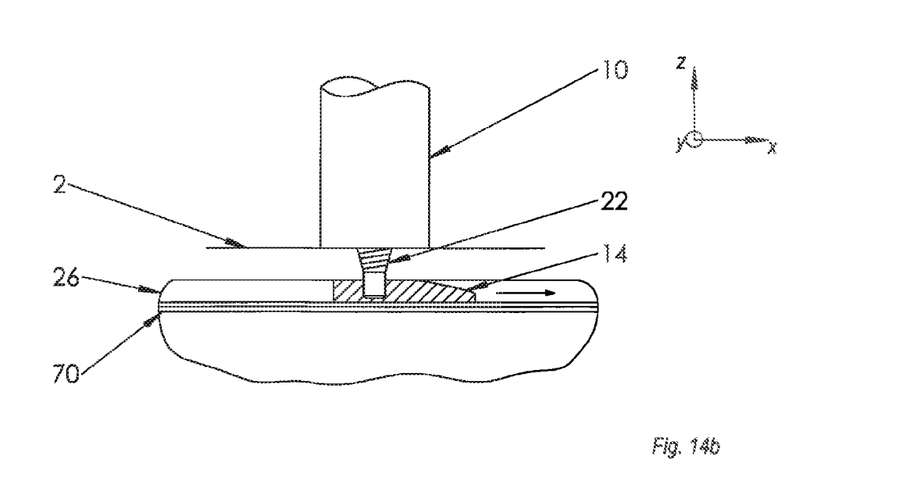

According to the exemplary embodiment according to FIGS. 14a and 14b, a sliding insert 70, for example comprising bronze, is inserted in a recess 69 of the support 12, which sliding insert 70 defines the channel 26 for the slide 14. The sliding insert 70 has a height h that corresponds to the depth t of the recess 69 so that the surface 71 of the sliding insert finishes off so as to be flush with the supporting surface 24 of the support 12. The sliding insert 70 encompasses the slide 14 in the region of its bottom surface 46 as well as lateral surfaces 48, 50, and on the bottom comprises a longitudinal indentation 74 to increase the distance between the head section 40 of the stirring pin 22 and the base area 76 of the channel 26.

FIG. 15 shows a plain bearing arrangement of the slide 14 in the channel 26, in which plain bearing arrangement the slide 14 is held on two parallel slide rails 78, 80, which in the region of the channel bottom wall 28 extend in the x-direction. For guiding or holding the slide 14 on the slide rails 78, 80, said slide comprises two longitudinal grooves 82, 84 on the bottom, which longitudinal grooves 82, 84 are designed in such a manner that the slide 14 with its bottom surface 46 and with its lateral surfaces 48, 50 is spaced apart from the bottom wall 28. In addition, the lateral surfaces 48, 50 of the slide are spaced apart from the lateral walls 30, 32, and consequently a very low friction coefficient is achieved because the slide 14 establishes frictional contact with the channel 26 only in the region of the longitudinal grooves 82, 84 or the slide rails 78, 80. In order to prevent the slide 14 from falling out during welding work where the tool 10 is positioned underneath the components 2, 4, and thus underneath the slide 14, for example during overhead work, the slide rails 78, 80 form a dovetail guide with the longitudinal grooves 82, 84, which dovetail guide is preferably in each case self-locking.

Figure 16:
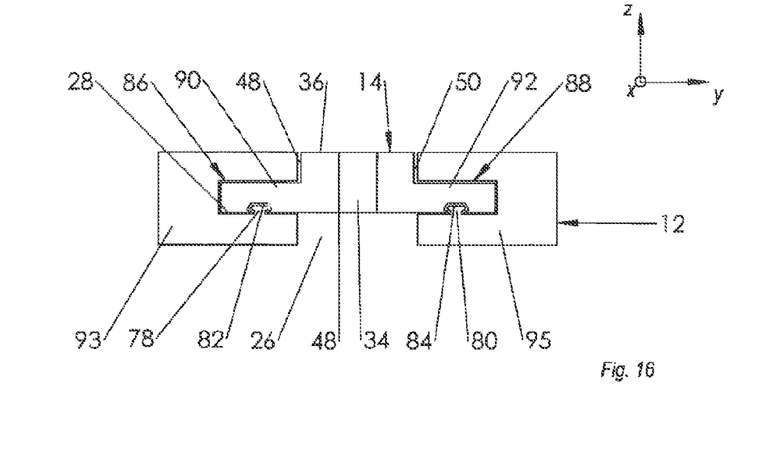
FIG. 16 a section of a further alternative plain bearing arrangement of the slide.

According to the illustration in FIG. 16, in one exemplary embodiment the slide rails 78, 80 are arranged in lateral tunnels 86, 88 of the channel 26, which tunnels extend in longitudinal direction. As a result of this the space between the slide rails 78, 80 is increased, which in principle makes possible quieter guiding of the slide 14. To form the corresponding longitudinal grooves 82, 84, the slide 14 on its lateral surfaces 48, 50 in each case comprises a projection 90, 92 that extends in longitudinal direction, and consequently said lateral surfaces 48, 50, starting from the supporting surface 36 are expanded in a stepped manner in the direction of the bottom surface 46. In addition, the channel 26 is open between the slide rails 78, 80 in the region of its bottom wall 28, and consequently the support 12 is of a quasi-two-part design with supporting parts 93, 95 that are spaced apart from each other, and the space between the slide rails 78, 80 can be flexibly adjusted in the transverse direction y, which makes it possible to optimally adjust the slide width to the components 2, 4 to be welded.

Figure 17A:
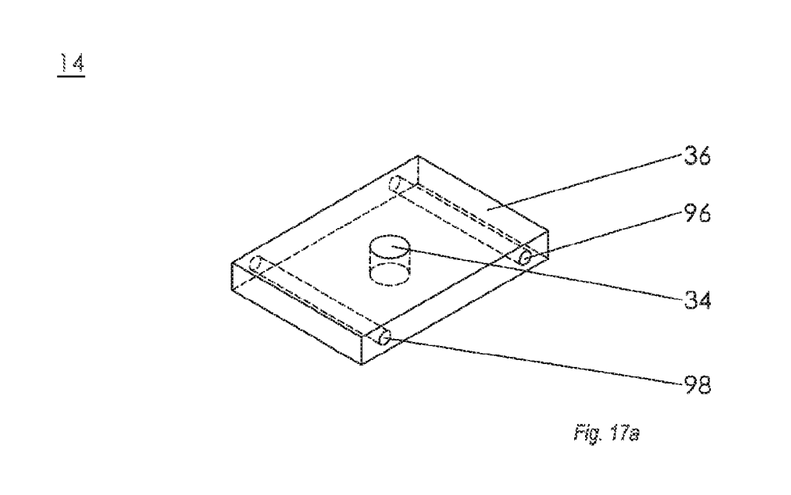
FIGS. 17a and 17b sections of a roller bearing arrangement of the slide, according to the invention.
Figure 17B:
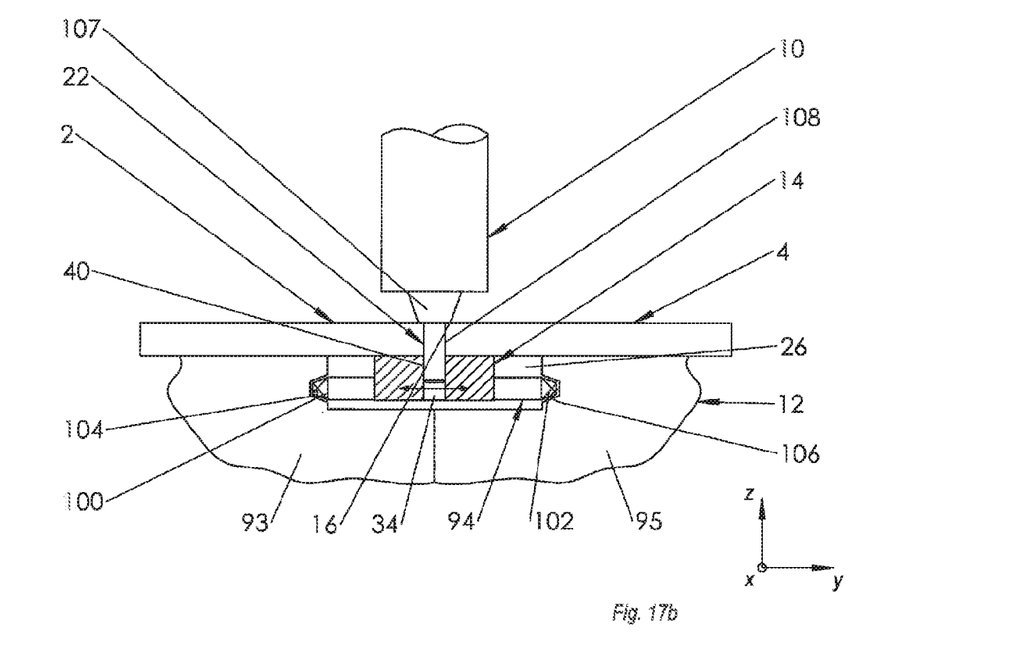

FIGS. 17a and 17b show a roller bearing arrangement of a rectangular slide 14 in the channel 26, which roller bearing arrangement also prevents the slide 14 from falling from the channel 26. The slide 14 is guided on two rollers 94 that are arranged beside each other so as to be parallel to each other, which rollers 94 in each case are guided in a bearing bore 96, 98 that penetrates the slide 14 in the y-direction, and by their end sections 100, 102 are guided in each case in a longitudinal indentation made in the sidewalls 30, 32. The end sections 100, 102 preferably taper off in a conical manner, and the longitudinal depressions 104, 106 correspondingly comprise an approximately trapezoidal cross section. In the state of the components 2, 4 clamped to the support 12, said components 2, 4 rest on the supporting surface 36 of the slide 14 that is supported by way of the end sections 100, 102 of the rollers 94 in the channel 26 and thus on the support 12. The bottom surface 46 and the lateral surfaces 48, 50 of the slide 14 are spaced apart from the opposite walls 28, 30, 32 of the channel 26. The slide 14 is guided on the rollers 94 so as to be slidable in the transverse direction y of the channel 26 so that incorrect positioning of the components 2, 4 during clamping or placement onto the support 12 can be compensated for within certain tolerance limits.

Moreover, in this exemplary embodiment the shoulder surface 16 is formed on the face of a conically tapering cylinder section 107. The conical section 107 makes a transition to a cylindrical body section 108 that plunges into the butt joint and at its end comprises the head section 40. Thus this exemplary embodiment does not comprise a conical threaded section 38. The cylindrical body section 108 and the head section 40 comprise a uniform exterior diameter.

Furthermore, the support 12 is made in two parts, wherein its two supporting parts 93, 95 in the region of the channel 26 are brought together by way of a butt joint. As a result of this, in particular, inserting or removing the slide 14 into or from the channel 26 is facilitated.

Figure 18:
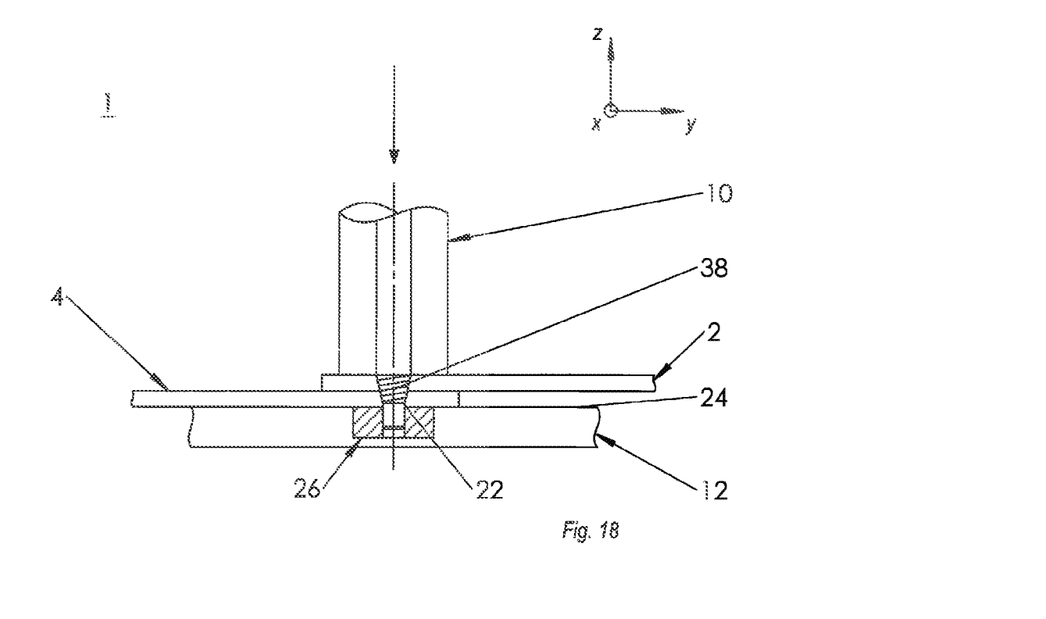
FIG. 18 the use of the exemplary embodiment according to the invention to produce an overlap connection.

FIG. 18 shows an application of the device 1 according to the invention for welding two components 2, 4 that overlap. In the region of the joining zone the lower component 4 in the illustration is supported by the slide 26. In the region of the joining zone the upper component 2 is supported by the lower component 4 and is subjected to a process force by way of the shoulder surface 16. The stirring pin 22 penetrates both components 2, 4 and, corresponding to the cumulative component thicknesses in the z-direction, when compared to the previously described exemplary embodiments comprises an axially elongated threaded section 38.

Disclosed is a method for friction stir welding two components, with a rotating tool that comprises a rotating or non-rotating shoulder surface for subjecting the components to a process force in the region of a joining zone, and with a rotating stirring pin for stirring plasticized material or for plasticizing and stirring the components in the region of the joining zone, in which method a stirring pin with a section slidably plunges in a slide on which the components are supported, which slide is guided along the joining zone on a side of the components, which side faces away from the tool, so that during welding an automatic relative movement between the stirring pin and the slide or the shoulder surface of the tool and a support surface of the slide, which support surface supports the components, is made possible, as well as a device for implementing such a method.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

LIST OF REFERENCE CHARACTERS

1 Device
2 Component
4 Component
6 Edge region
8 Edge region
10 Tool
12 Support
14 Slide
16 Shoulder surface
18 Edge area
20 Edge area
22 Stirring pin
24 Supporting surface
26 Channel
28 Bottom wall
30 Sidewall 32 Sidewall
34 Bore
36 Supporting surface
37 Weld seam
38 Threaded section
40 Head section
42 Guide section
44 Axial bore
46 Bottom surface
48 Lateral surface
50 Lateral surface
52 Wedge surface
54 Nose region
56 Rear region
57 End face
58 Outer circumferential wall
60 Gap
61 Gap
62 Outer wall
64 Inner wall
66 Sliding bush
68 Section
69 Recess
70 Sliding insert
71 Surface
72 Bottom surface
74 Indentation
76 Base area
78 Slide rail
80 Slide rail
82 Longitudinal groove
84 Longitudinal groove
86 Tunnel
88 Tunnel
90 Projection
92 Projection
93 Supporting part
94 Roller
95 Supporting part
96 Bearing bore
98 Bearing bore
100 End section
102 End section
104 Longitudinal depression
106 Longitudinal depression
107 Conical section
108 Body section

The invention claimed is:

1. A device for connecting two components by friction stir welding comprising:
a tool,
a support, and
a slide,
wherein the tool comprises a shoulder surface for subjecting the components to a process force in the region of a joining zone and a rotatable stirring pin for stirring plasticized material or for plasticizing and stirring the components in the region of the joining zone,
wherein the support has a supporting surface for placing the components,
wherein a channel is formed in the supporting surface of the support,
wherein the slide is guided in the channel by a plain bearing arrangement, such that the slide being movably guided along the joining zone on a side of the components, wherein said side facing away from the tool,
wherein the slide comprises a further supporting surface facing towards the shoulder surface of the tool,
wherein the slide is adapted for supporting the components,
wherein the slide receives the stirring pin,
wherein the slide is adapted for a section-by-section slidable reception of the stirring pin,
wherein the slide is not fixed to the stirring pin,
wherein the tool being held so as to be slidable in a vertical direction relative to the slide, and
wherein a maximum height of the slide including its bearing arrangement essentially corresponds to a maximum depth of the channel, so that a supporting surface of the slide for supporting the components in the joining zone region finishes so as to be flush with the supporting surface of the support.

2. The device according to claim 1, wherein the slide further comprises a bore for receiving a head section of the stirring pin.

3. The device according to claim 1, wherein the plain bearing blocks movement of the slide in the direction of the vertical axis of the joining zone.

4. The device according to claim 1, wherein a supporting surface of the slide in a longitudinal direction of the joining zone is curved.

5. The device according to claim 1, wherein the slide has a wedge-like nose region.

6. A method for connecting two components by friction stir welding with the device according to claim 1, the process comprising:
slidably plunging a section of the stirring pin in the slide on which the components are supported; and,
guiding the slide along the joining zone on the side of the components, which side faces away from the tool.

7. The method according to claim 6, wherein the slide is guided along by the stirring pin by way of active engagement.

8. The method according to claim 6, wherein the slide is driven at least partially by way of a slide drive.

9. The method according to claim 6, wherein a position of the tool in an x-y plane of the joining zone is defined by way of a position of the slide.

10. The method according to claim 6, further comprising: making a through-hole in the joining zone at a beginning of the process in order to bring about the active engagement between the stirring pin and the slide.

* * * * *